United States Patent [19]
Donnelly et al.

[11] Patent Number: 6,159,345
[45] Date of Patent: Dec. 12, 2000

[54] METHOD AND APPARATUS FOR RECOVERING AND/OR RECYCLING SOLVENTS

[75] Inventors: John C. Donnelly, Norfolk; Guerry L. Grune, Virginia Beach; Gregory A. Frick; Kenneth L. Marsh, both of Chesapeake, all of Va.

[73] Assignee: Mitsubishi Chemical America, Inc., Chesapeake, Va.

[21] Appl. No.: 09/187,526

[22] Filed: Nov. 6, 1998

[51] Int. Cl.[7] .............................. B01D 3/34; B01D 3/42; C07D 307/08
[52] U.S. Cl. .............................. 203/1; 202/160; 202/170; 202/205; 203/2; 203/6; 203/57; 203/69; 203/100; 203/91; 549/509
[58] Field of Search .................................... 203/6, 49, 91, 203/100, 57, 2, 69, 1; 202/202, 205, 170, 160; 159/DIG. 20, DIG. 16, DIG. 1, 47.1, 44; 549/295, 429, 509

[56] References Cited

U.S. PATENT DOCUMENTS

| | | |
|---|---|---|
| 3,713,991 | 1/1973 | Thomas . |
| 3,901,767 | 8/1975 | Williams ............................ 159/DIG. 1 |
| 4,073,720 | 2/1978 | Whisman et al. . |
| 4,093,633 | 6/1978 | Tanabe et al. . |
| 4,144,138 | 3/1979 | Rao et al. . |
| 4,257,961 | 3/1981 | Coates . |
| 4,271,081 | 6/1981 | Murib et al. . |
| 4,273,623 | 6/1981 | Hashimoto et al. . |
| 4,413,136 | 11/1983 | Ernst et al. . |
| 4,461,676 | 7/1984 | Del Pesco et al. . |
| 4,478,685 | 10/1984 | Mortenson . |
| 4,495,034 | 1/1985 | Lucas . |
| 4,708,775 | 11/1987 | McGregor et al. . |
| 4,902,310 | 2/1990 | Vara et al. . |
| 4,912,236 | 3/1990 | Palm et al. . |
| 4,918,204 | 4/1990 | Shih et al. . |
| 4,919,692 | 4/1990 | Vara et al. . |
| 4,919,765 | 4/1990 | Wilkes et al. . |
| 5,128,490 | 7/1992 | Uwe et al. . |
| 5,310,954 | 5/1994 | Hiles et al. . |
| 5,313,005 | 5/1994 | Smith, Jr. et al. . |
| 5,472,576 | 12/1995 | Berberi . |
| 5,490,907 | 2/1996 | Weinwurm et al. ...................... 203/91 |
| 5,531,867 | 7/1996 | Crooker et al. ............................. 203/6 |
| 5,628,880 | 5/1997 | Hearn et al. . |
| 5,632,867 | 5/1997 | Davis et al. . |
| 5,663,454 | 9/1997 | Preston . |
| 5,665,208 | 9/1997 | Giesselmann . |
| 5,770,019 | 6/1998 | Kurematsu et al. ................... 202/160 |
| 5,968,882 | 10/1999 | Matsuhisa et al. ..................... 510/245 |
| 5,980,695 | 11/1999 | Cox et al. ............................... 202/205 |

OTHER PUBLICATIONS

EPA Form 8700–22 (Rev. Nov. 1988), North Carolina Hazardous Waste Manifest Form.
Picture of Solvent Recovery Building.

*Primary Examiner*—Virginia Manoharan
*Attorney, Agent, or Firm*—Oblon, Spivak, McClelland, Maier & Neustadt, P.C.

[57] ABSTRACT

A method and apparatus for recycling and recovering potentially explosive solvents includes providing a contaminated solvent to a distillation tank, vaporizing the solvent in the distillation tank, thereby producing solvent vapor, condensing the solvent vapor, and adding a free radical scavenger substance to the distillation tank during the heating step. The vapor is then condensed and collected in a clean solvent tank where additional free radical scavenger substance is added to the clean solvent tank. Preferably, contaminated solvent is introduced into the solvent recovery system by providing contaminated solvent into contaminated solvent tank which is connected to the distillation tank, and an oxygen displacer substance is provided to the contaminated solvent tank and the clean solvent tank so as to minimize the amount of free oxygen in the tanks.

25 Claims, 4 Drawing Sheets

METHOD AND APPARATUS FOR RECOVERING AND/OR RECYCLING SOLVENTS

TECHNICAL FIELD

The invention relates to a method and apparatus for recycling/recovering used (spent) solvents, and particularly to a method for recycling and recovery of solvents which are potentially explosive (have low flash points), such as solvents which tend to decompose into peroxides or other small molecule analogs which generate explosive vapors.

BACKGROUND OF THE INVENTION

Discussion of the Background

Solvents are widely used in manufacturing processes as cleaning agents. In the past, used solvents have been discarded. However, as the disposal costs for toxic chemicals has risen, it is now imperative that toxins such as solvents are recycled and reused as much as possible.

Organic solvents, such as tetrahydrofuran (THF), are widely used in the area of photoconductive drum manufacturing for photocopiers or printers. For example, a photoconductive drum is commonly coated with a charge-transport material (CTM), and an appropriate binder resin. The CTM is usually a low molecular weight organic compound, and the binder resin generally belongs to the class of aromatic polycarbonates (PCR). After the CTM and the PCR are applied to the photoconductive drum, which typically includes a hollow metal cylinder substrate, the edges of the drum are cleaned with an organic solvent such as THF. The use of THF in manufacturing photoconductive drums and in manufacturing other products results in a large amount of used THF that has heretofore been discarded.

Although THF is a useful solvent, it has the drawback of forming explosive vapors (such as peroxides) when it is exposed to oxygen. Therefore, THF has a limited shelf life and can be difficult to reuse in that if THF is reused for cleaning purposes, it is likely to begin producing explosive vapors after a predetermined amount of time.

In order to reduce the likelihood of the production of explosive vapors, free radical scavenger substances such as butylated hydroxy toluene (BHT) have been added to organic solvents, such as THF, in order to stabilize the solvent and prevent formation of peroxides when the solvent is exposed to oxygen. However, as THF is exposed to oxygen, BHT is depleted over time, leading to the formation of explosive vapors, for example, in a container holding THF. Therefore, THF is commonly discarded after it is used for a predetermined amount of time.

Under current U.S. and state/local regulations, a generator or source of hazardous waste, such as solvents, must track the amount of waste generated and submit forms reporting the amounts disposed of to the federal and/or state EPAs, depending on the amount of waste produced. Furthermore, A "Hazardous Waste Manifest" may require the generator of the waste to certify that they have a program in place to reduce the volume and toxicity of waste generated to the degree economically practicable and that they have selected the practicable method of treatment, storage, or disposal currently available which minimizes the present and future threat to human health and the environment. See, e.g. EPA Form 8700-22, Item 16 (Rev. 11–88). Moreover, hazardous wastes are often costly to dispose, and a disposal company is often retained to transport and adequately dispose of the waste. The discarded solvent must then be replaced with additional solvent, and thus additional solvent costs are incurred. Therefore, there is a need for a safe and efficient method for recovering and recycling toxic/hazardous wastes such as solvents.

It has been known to recycle solvents through a method of vaporizing the solvent through heating, and condensing the vapor in a known condenser. However, such a method poses a substantial risk of explosion when used for recycling volatile solvents such as THF. As described above, if THF is used and stored for a predetermined amount of time, the BHT is depleted and volatile vapors form. Therefore, THF has not heretofore been recycled utilizing a distillation process. Thus, there remains a need for a method and apparatus for safely recycling a volatile solvent that does not pose a risk of the formation of explosive vapors, so that the solvent can be reused.

SUMMARY OF THE INVENTION

It is an object of the present invention to provide a method for recycling potentially explosive solvents without producing, or minimizing the production of, explosive vapors.

It is another object of the invention to provide a cost efficient manner of recovery using only electrical heating of a petroleum based heating oil for distillation.

It is another object of the invention to provide a method of recovering and recycling potentially explosive solvents using vaporization by exposure to a reduced pressure environment or a "vacuum".

It is yet another object of the invention to reduce the need to transport and dispose of "spent" or used solvent materials.

The above and other objects and advantages are achieved in accordance with the present invention by providing a solvent recovery system which includes a distillation tank, into which is fed contaminated solvent from the contaminated solvent tank and which vaporizes the contaminated solvent. In addition, a free radical scavenger tank holds a free radical scavenging material and the free radical scavenger material is fed to the distillation tank. Preferably, the free radical scavenger material is also fed to a clean solvent tank, which is disposed downstream from the distillation tank. By feeding the free radical scavenger material to the distillation tank and the clean solvent tank, the recovery system ensures that explosive vapors are not formed during or after the distillation process; in the distillation tank or in the clean solvent tank.

In a presently preferred form of the invention, the solvent recovery system includes a contaminated solvent tank for holding used solvent, a condensor for condensing vaporized solvent leaving the distillation tank and an oxygen displacer source connected to the system to supply an oxygen displacer gas to the contaminated solvent tank, the free radical scavenger tank, and the clean solvent tank. By supplying the oxygen displacer gas to the individual tanks (in series or in parallel), the recovery system ensures that the amount of oxygen in each of the tanks is kept at a minimum. Preferably, the contaminated solvent tank, the free radical scavenger tank and the clean solvent tank each include vents equipped with charcoal filters so that a constant flow of oxygen displacer material gas (e.g., nitrogen) can be provided to each tank.

It is preferable that the distillation tank is heated with a heating oil that is heated by electrical resistance heaters. The electrical resistance heaters are used to bring the heating oil to a proper distillation temperature. Thereafter, the heating oil surrounds the distillation tank and thus heats the contaminated solvent therein. This provides for much safer heating of the solvent in the distillation tank in comparison to using electrical resistance heaters directly inside the distillation tank, which could result in the solvent directly contacting the electrical resistance heater, causing an explosion as a result of overheating or arcing.

In an alternative embodiment, vaporization of the contaminated solvent is performed by exposing the solvent to a reduced pressure atmosphere or vacuum. Using this method, the risk of explosion is significantly reduced since no heat is applied to the solvent. Furthermore, such a system is significantly less complicated than a system that uses heat to vaporize the solvent. It is also possible to utilize a reduced pressure in combination with the application of heat. With this arrangement, less heat is required to vaporize the solvent as a result of the reduced pressure environment of the solvent.

BRIEF DESCRIPTION OF THE DRAWINGS

Other objects and advantages of the present invention will become readily apparent as the same becomes better understood with reference to the following detailed description, particularly when considered in conjunction with the drawings in which.

DESCRIPTION OF THE PREFERRED EMBODIMENTS

Figure 1:
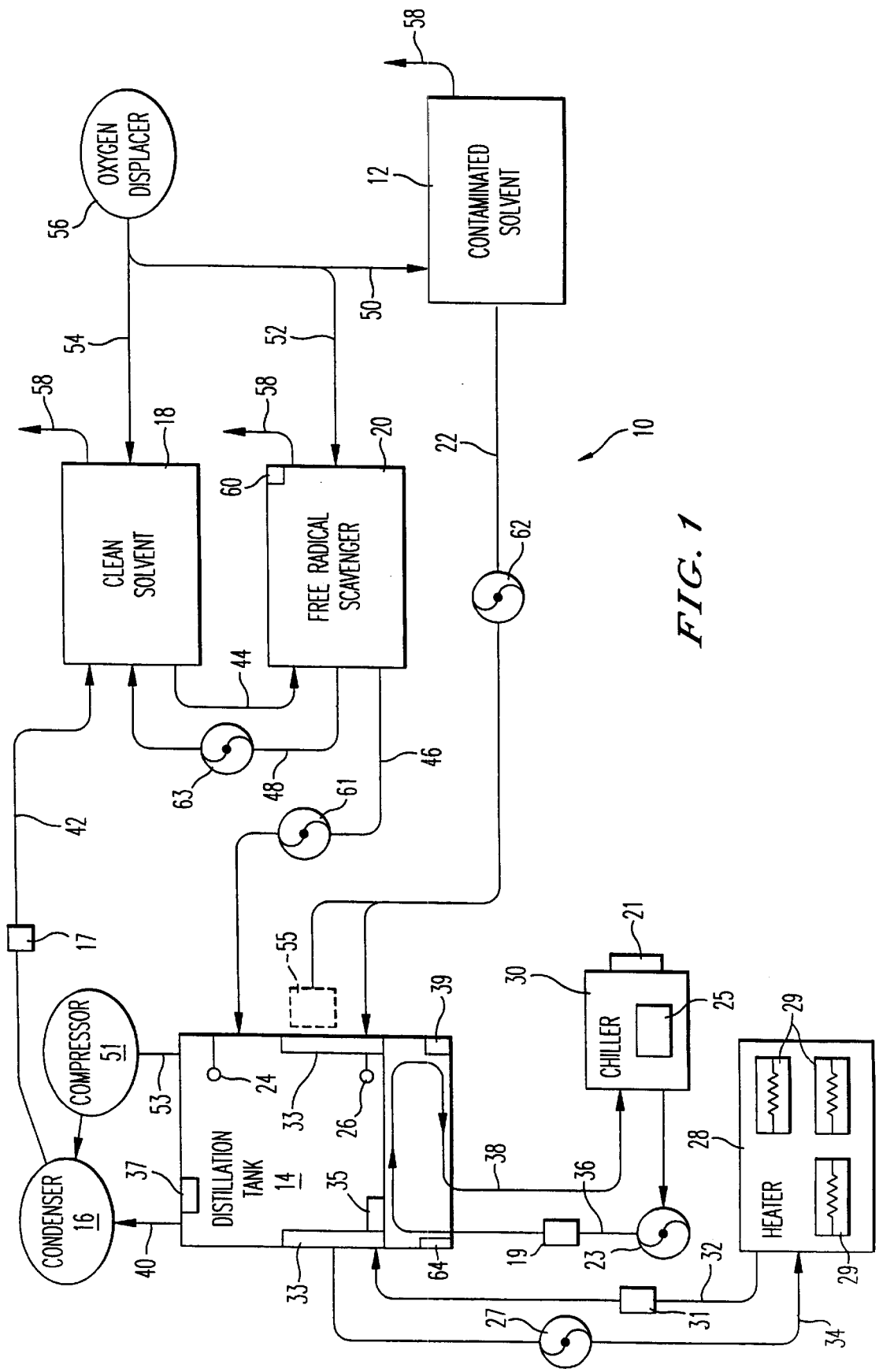
FIG. 1 schematically represents a solvent recovery system according to the present invention.

A solvent recovery system 10 for cleaning a contaminated and volatile solvent through distillation according to the present invention is generally illustrated in FIG. 1. It includes a contaminated solvent tank 12, a distillation tank 14, a condenser 16, a clean solvent tank 18, and a free radical scavenger tank 20.

Contaminated solvent tank 12 can be of various sizes depending upon the requirements of the system. Contaminated or used solvent is typically brought to the recovery system in 55 gallon drums and is hand-pumped into the contaminated solvent tank 12. Solvent tank 12 is connected to the distillation tank preferably by a stainless steel pipe 22 which is, e.g., approximately one-half inch in diameter. Contaminated solvent can be fed to tank 14 by contaminated solvent pump 62, or by gravity.

Distillation tank 14 preferably comprises a cylindrical stainless steel vessel capable of holding approximately 110 gallons of solvent. However, distillation tank 14 may be constructed of any solvent resistant material and be of other sizes. Tank 14 is preferably provided with three switches, a top float switch 24, an additional safety top switch 24A, and lower float switch 26. Top float switch 24 can be connected to a controller for controlling the level of contaminated solvent in the distillation tank and lower switch 26 can also be connected to controller to ensure there is at least a minimum level of solvent in the distillation tank. Thus, the distillation process can operate continuously, with the feed of used solvent to the distillation tank controlled so that the amount of solvent in the tank is within upper and lower limits as determined by the level sensors. It is to be understood that various expedients could be utilized other than level sensors, e.g., flow meters or controls based upon flow amounts, or strain gauges which sense the amount of solvent in the tank, etc.

Preferably, tank 14 includes temperature sensor 39 positioned to detect the temperature of stillbottoms that collect in a bottom portion of tank 14, temperature sensor 35 positioned to detect the temperature of the liquid solvent in tank 14, and temperature sensor 37 positioned to detect the temperature of vapor produced in tank 14. Temperature sensors 35, 37 and 39 are preferably thermocouples, however, they may be comprised of any known temperature sensing instrument. Distillation tank 14 is preferably connected to a heated oil bath 28, which is used to control vaporization of the solvent in the distillation tank 14.

In a presently preferred form, the heating elements 29 includes a plurality of electrical resistance heaters, for example three electrical resistance heaters, which are used to bring a heat transfer medium to a temperature sufficient to cause the solvent to boil. In a present embodiment, an oil is used as the heat transfer medium within an oil bath 28. Preferably, temperature sensor 31 is provided within oil bath 28 and positioned so as to detect the temperature of the oil. Alternatively, a separate heater 28a may be used to remotely heat a heat transfer medium and circulate the heater transfer medium through oil bath 28.

Chiller 30 uses, e.g., a cooling water as a working fluid and is connected to condensor tank 16 through cooling fluid supply pipe 36 and cooling fluid return pipe 38. Cooling water is fed to tank 16 through pump 23 and supply pipe 36 whereby the cooling water is subsequently circulated through condenser 16. After circulating though the condenser 16, the cooling water returns to chiller 30 via return pipe 38. Preferably, chiller 30 includes a thermostat 21 which is configured to control the operation of a compressor 25 within chiller 30 so as to maintain a substantially constant temperature of the cooling water.

Distillation tank 14 is connected to condenser 16 through vapor duct 40. Vapor duct 40 provides a passage for vaporized solvent to leave distillation tank 14 and enter condenser 16. Vapor duct 40 includes a known "packed" column filter 41 which utilizes a fine wire mesh packing material, which is packed into a column. As the vapor rises through vapor duct 40 and the packed column, the vapor is filtered through the fine wire mesh whereby particles are captured by the mesh. Some condensation may also occur in the packed column 41. Preferably, the condenser 16 is designed to recover a distillate which is greater than 99.5% pure of the original solvent. Also preferably, packed column 41 is configured to receive distillation plates which are well known in the art, in addition to the mesh to attain higher purity yields if desired.

Condenser 16 is attached to clean solvent tank 18 through clean solvent pipe 42. The clean solvent tank 18 can be of any size. In a present form, the solvent tank 18 has a capacity of 550 gallons, or the equivalent of ten 55 gallon drums. Preferably, temperature sensor 17 is provided between condenser 16 and clean solvent tank 18 so as to detect the temperature of distilled solvent leaving condenser 16. If desired for certain applications, condenser 16 could be eliminated, and the solvent could be condensed by other condenser assemblies, or the solvent could be condensed as it travels along a pipe (e.g., a cooled pipe) to the clean solvent tank. However, the packed column and condenser arrangement is presently preferred as it provides a large surface area (via the wire mesh) for filtration of the vapor exiting from the distillation tank as well as complete condensation of the vapor.

In order to ensure the stability of the solvent while it is in the recovery system, the recovery system 10 includes a free radical scavenger tank 20, which contains and dispenses a material that absorbs free radicals, such as BHT. In the presently preferred embodiment, free radical scavenger tank 20 is fed with clean solvent from clean solvent tank 18 through clean solvent supply line 44, so that the BHT is held in a solution of THF and BHT. Free radical scavenger tank 20 is provided with two outputs, free radical scavenger supply line 46 for supplying the free radical scavenger substance to the distillation tank 14, and free radical scavenger supply line 48 for supplying free radical scavenger material to the clean solvent tank 18. The free radical scavenger tank 20 thus receives clean solvent from the clean solvent tank 18, and mixes the free radical scavenger material such as BHT (which is a powder at room temperature) with the clean solvent so as to form a solvent having a concentration of free radical scavenger material (e.g., with a concentration of approximately 5700 ppm). The highly concentrated mixture is then supplied to distillation tank 14 and clean solvent tank 18 so as to produce the desired resulting concentration of free radical scavenger material in the clean solvent tank 18 and the distillation tank 14.

As an additional safety precaution, contaminated solvent tank 12, free radical scavenger tank 20, and clean solvent tank 18 can optionally be fed an oxygen displacer substance, such as nitrogen gas, through oxygen displacer ducts 50, 52 and 54, respectively. Preferably, oxygen displacer tank 56 supplies oxygen displacer gas at slightly above atmospheric pressure so that there is only a slight positive pressure provided to the recovery system. For example, in the recovery system 10 for recovering and recycling THF, where BHT is used as a free radical scavenger, nitrogen gas may be used as an oxygen displacer where it is provided at a pressure of 14.8 psia. Preferably, the contaminated solvent tank 12, free radical scavenger tank 20 and clean solvent tank 18 are provided with vents 58, which may include charcoal filters (not shown), to allow the oxygen displacer gas to flow out of the tanks. By providing the tanks 18, 20 and 12 with a flow of an oxygen displacer gas, the amount of oxygen above the liquid level in those tanks is kept at a minimum thereby reducing the likelihood of peroxides forming or accumulating and the corresponding likelihood of explosion. Typically, two compressed liquid nitrogen tanks are used to provide nitrogen gas to tanks 12, 20 and 18. In this example, one liquid nitrogen tank is provided with a regulation valve on top of the cylinder (not shown). The regulation valve is set to reduce the pressure to slightly above atmospheric levels and also to control the flowrate of gaseous nitrogen to tanks 12, 20 and 18. The entire system is thereby slightly pressurized for removal of as much of the available oxygen as possible. Dalton's law of partial pressures, however, may allow for some reentry of the surrounding atmospheric gases which can be prevented by suitable apparatus (in lieu of the charcoal filters) such as flexible tubing attached to the exit ports of the respective solvent holding tanks which are fed through appropriate aqueous solutions.

By way of example, in recovering contaminated THF solvent, BHT is used as a free radical scavenger, nitrogen gas is used as an oxygen displacer. Preferably, the recovery system 10 is kept in an air conditioned facility such that the ambient temperature does not exceed 100 F. The nitrogen gas can also provide some cooling. Preferably, contaminated solvent tank 12 is kept with a maximum amount of liquid in the tank so that there is little room in the tank for vapor to form. Therefore, only a small flowrate of nitrogen gas is needed to remove any oxygen in the tank and prevent peroxides from forming. Furthermore, BHT can be added directly to the contaminated solvent tank 12 as an additional precaution, particularly if the BHT of the contaminated solvent is believed to be quite low.

With the foregoing in mind, the operation of the present system/process will now be described. Prior to starting the recovery system 10, the free radical scavenger tank 20, which is filled with a concentrated solution of BHT in THF, is sampled and checked for concentration, via gas chromophotography. Based on this analysis, additional BHT may be added to the free radical scavenger tank to ensure that there is, e.g., greater than 5,300 parts per million BHT concentration in the solvent (i.e., the solvent in the tank 20 within which the BHT is suspended). A magnetic read switch 60 may be installed on the free radical scavenger tank so that the system may not be started unless the tank is full. As another safety precaution, the system can be prevented from starting until chiller 30 is started. Since there is no danger of overheating the stillbottoms or the vapor in the distillation tank 14 or condenser 16 when the system is starting from a cold start-up, the start-up of chiller 30 may be delayed until the temperature inside the distillation tank 14 is 120 F. THF vapor is produced when the THF is heated to 120 F. (above the boiling point of THF) and allows for an efficient distillation and condensed recovery without the need to control still bottoms temperature. Alternatively, the still bottoms temperature could be controlled by directing cooling coils to this portion of the distillation vessel 14.

Upon starting recovery system 10, pump 61 is turned on for approximately 20 minutes wherein the distillation tank 14 is injected with additive from tank 20. After the additive injection cycle is started, contaminated solvent from tank 12 is automatically pumped to tank 14 by pump 62 for a maximum of 26 minutes or until solvent reaches the top float switch 24. Top float switch 24 (A) is provided as an additional safety mechanism to ensure that overfill cannot occur. Preferably, tank 14 is provided with 110 gallons of contaminated solvent. Once distillation tank 14 is filled, elements 29 ro 29a are started in order to heat the oil to 280 F. As described above, the chiller may be activated when the THF in the distillation tank 14 is brought to a boil and the vapor reaches 120 F. Upon activation of the chiller, the compressor 25 in the chiller is allowed to run for approximately 1 minute and 45 seconds prior to the beginning of the circulation of cooling fluid through pipes 38 and 36. As the solvent in distillation tank 14 continues to boil and generate vapor, the vapor rises through vapor duct 40 into condenser 16. As the vapor rises through condenser 16, it condenses within condenser 16 and thereafter leaves the condenser through clean solvent line 42 to the clean solvent tank 18.

As the level of solvent in distillation tank 14 drops, top float switch 24 is eventually triggered which is used to signal pump 62 to start to refill distillation tank 14. Preferably, pump 62 will automatically run for three minutes to refill distillation tank 14 with contaminated solvent from tank 12. By operating as such, top float 24 and pump 62 provide means for continuously filling distillation tank 14.

Although THF is quickly vaporized when heated to 155 F., BHT is not. Furthermore, although BHT is stable at room temperature, it decomposes when heated and is also further decomposed by unknown contaminates in the contaminated THF. The combination of the constantly decomposing BHT and the elevated temperature of the THF results in a particularly high risk of explosive vapors forming tank 14. Therefore, free radical scavenger tank 20 provides a supply of BHT solution to the distillation tank through line 46, pumped by free radical pump 61. Preferably, the concentration of BHT in the distillation tank 14 is maintained above 400 ppm. Free radical scavenger tank 20 is also connected to clean solvent tank 18 by solvent supply line 44 and free radical scavenger supply line 48. During operation, free radical scavenger tank 20 supplies the solution of BHT to the clean solvent tank 18 so that the concentration of BHT in the clean solvent tank 18 is maintained at greater than 400 ppm, through free radical pump 63. Once a sufficient amount of clean solvent has accumulated in clean solvent tank 18, the clean solvent can be hand-pumped or mechanically pumped out of tank 18 to a storage tank, such as a 55 gallon drum.

In order to provide protection against explosion, alarms or automatic system shut-offs (not shown) are provided to be triggered upon the occurrence of certain events. For example, the system is preferably shut down, and in particular elements 29 or 29a are shut down when the vapor temperature in the distillation tank 14 reaches 158 F. or above, when the temperature of the stillbottoms reaches 158 F. or above, or when bottom float 26 is triggered. Upon the occurance of these events, an alarm may be sounded, or the system may be shut down. If the system is shut down, it is preferable that under no circumstance is chiller 30 shut off at the occurrence of these events. It is preferable that only elements 29 or 29a are shut off. Preferably, chiller 30 continues running after an alarm or an automatic shut off because it is likely that heating oil in distillation tank 14 is still at approximately 280 F. and efficient condensation of vapor in the condenser can continue. Therefore, chiller 30 is allowed to run despite any alarm or automatic shut-off such that solvent in distillation tank 14 is completely cooled.

After the desired amount of solvent has been cleaned, and elements 29 or 29a are shut off, chiller 30 is allowed to continue to run until any solvent remaining in distillation tank 14 is cooled. Preferably, chiller 30 is allowed to run until the stillbottoms in the distillation tank 14 cool to at least 110 F. Once stillbottoms fall to such a temperature, the distillation tank can be opened and the stillbottoms removed through stillbottoms tap 64.

Periodically, the packing material in condenser 16, such as the fine wire mesh, should be replaced as it becomes filled with particulate contaminants removed from the solvent vapor.

As an alternative to the use of heat for vaporizing the solvent in the distillation tank, or in combination with the use of heat so that less heating is required, the liquid solvent in distillation tank 14 can be vaporized by applying a vacuum above the liquid solvent in tank 14 with vacuum means such as a vacuum pump 51, however, any known means for generating a vacuum or reduced pressure may be employed. In this embodiment, vacuum pump 51 is configured to generate a substantial vacuum above the liquid solvent in tank 14 such that the boiling point of the solvent is lowered to the ambient temperature. As the vapor passes through vacuum pump 51, it is compressed to approximately atmospheric pressure and at least partially to a liquid. In this embodiment, vacuum pump 51 serves as vaporization means as well as condenser means. At this point, any remaining vapor, which may be generated by heat associated with compression, can be extracted through a condenser such as condenser 16 so as to condense the vapor back to liquid and filter any remaining particulate contamination. Recovery system 10 may therefore include only a vacuum type vaporization means without or in conjunction with the heated arrangement discussed above.

By using a vacuum to vaporize the solvent to be recovered, the present embodiment substantially reduces the risk of explosion as the temperature of the solvent and solvent vapor remains relatively low throughout the recovery process. The application of negative or reduced pressure can also be advantageous in eliminating several components of the above-described system if desired. For example, since a vacuum driven vaporization process requires a substantial vacuum, pump 62 is not needed to move contaminated solvent from solvent tank 12 to distillation tank 14, since the solvent can be drawn from the tank by the vacuum or negative pressure. A valve such as an expansion valve 55 (shown in dashed lines in FIG. 1) may be used to control the flow of liquid solvent from contaminated solvent tank 12 to distillation tank 14, with the solvent thus vacuum fed into tank 14. Elements 29 or 29a can also be eliminated since vaporization by vacuum does not require heat, or the heating system could be down-sized/simplified if a combination of heat and negative pressure is utilized. Similarly, chiller 30 could be eliminated, particularly since the liquid solvent is not heated. However, chiller 30 may nevertheless be desirable for use in an emergency where distillation tank 14 is inadvertently heated.

Figure 2:
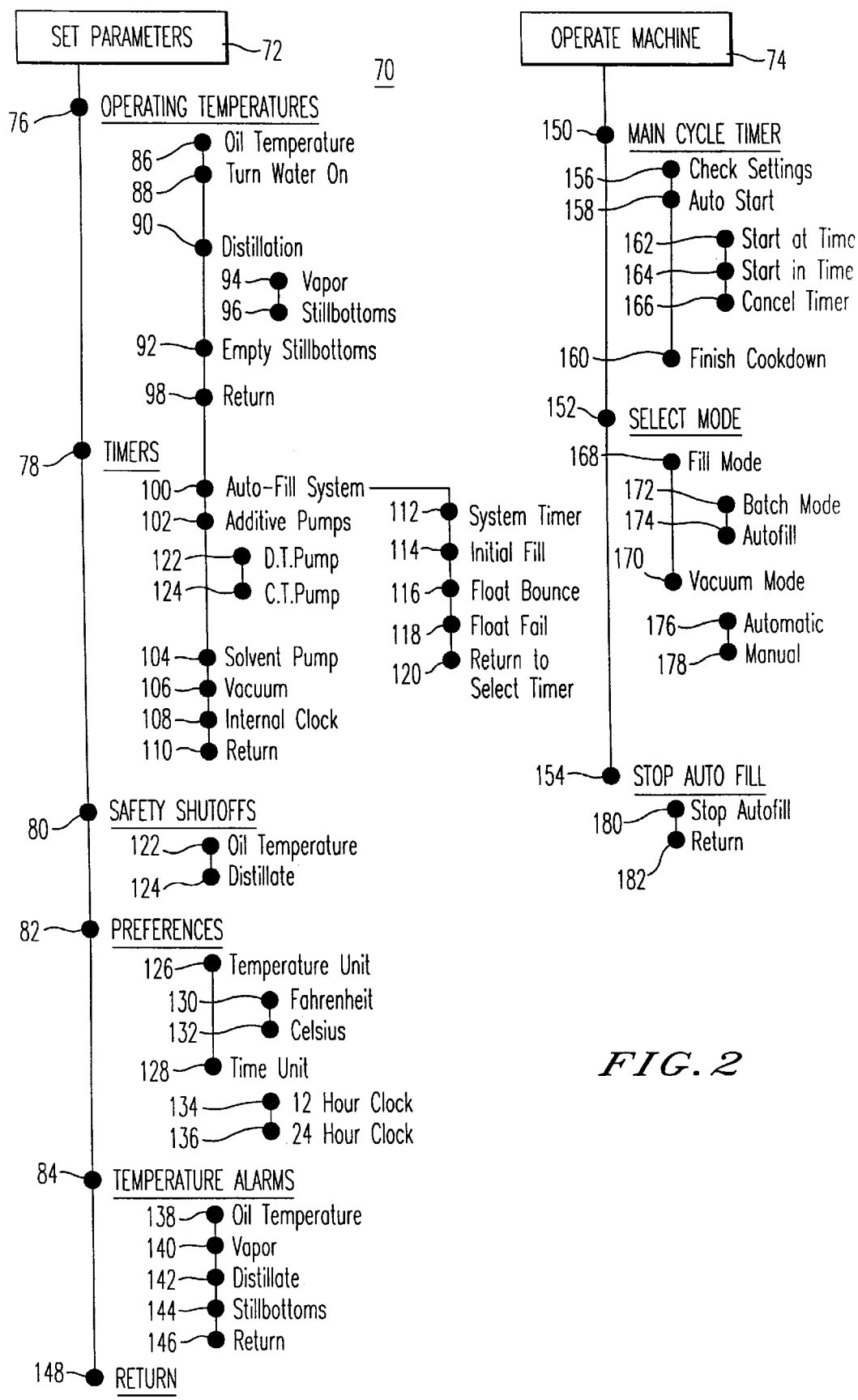
FIG. 2 is a schematic illustration of a computer or control system for performing a method of the present invention.

Referring now to FIG. 2, the operation of the vapor recovery system 10 can be coordinated with control system 70, a flowchart of which is illustrated in the figure. Control system 70 generally includes two categories of inputs, including set parameters input 72 and operate machine input parameters 74. The set parameters input 72 (described in detail hereinafter) generally includes inputs for operating parameters relating to the operation of the system such as operating temperatures, predetermined lengths of time for particular operations, safety shutoff thresholds, display preferences, and alarm thresholds. Operate machine input parameters 74 (described in detail hereinafter) generally includes inputs directed to operating options relating to the mode in which the system operates, e.g. timers for directing the system to start at a predetermined time or after a predetermined time has elapsed. Control system 70 may be comprised of a hard-wired electronic control system. Alternatively, control system 70 may be incorporated into computer software to be executed by a computer as illustrated in FIG. 3 and described below or into either a Programmable Logic Controller (PLC) or operator interface system.

Figure 3:
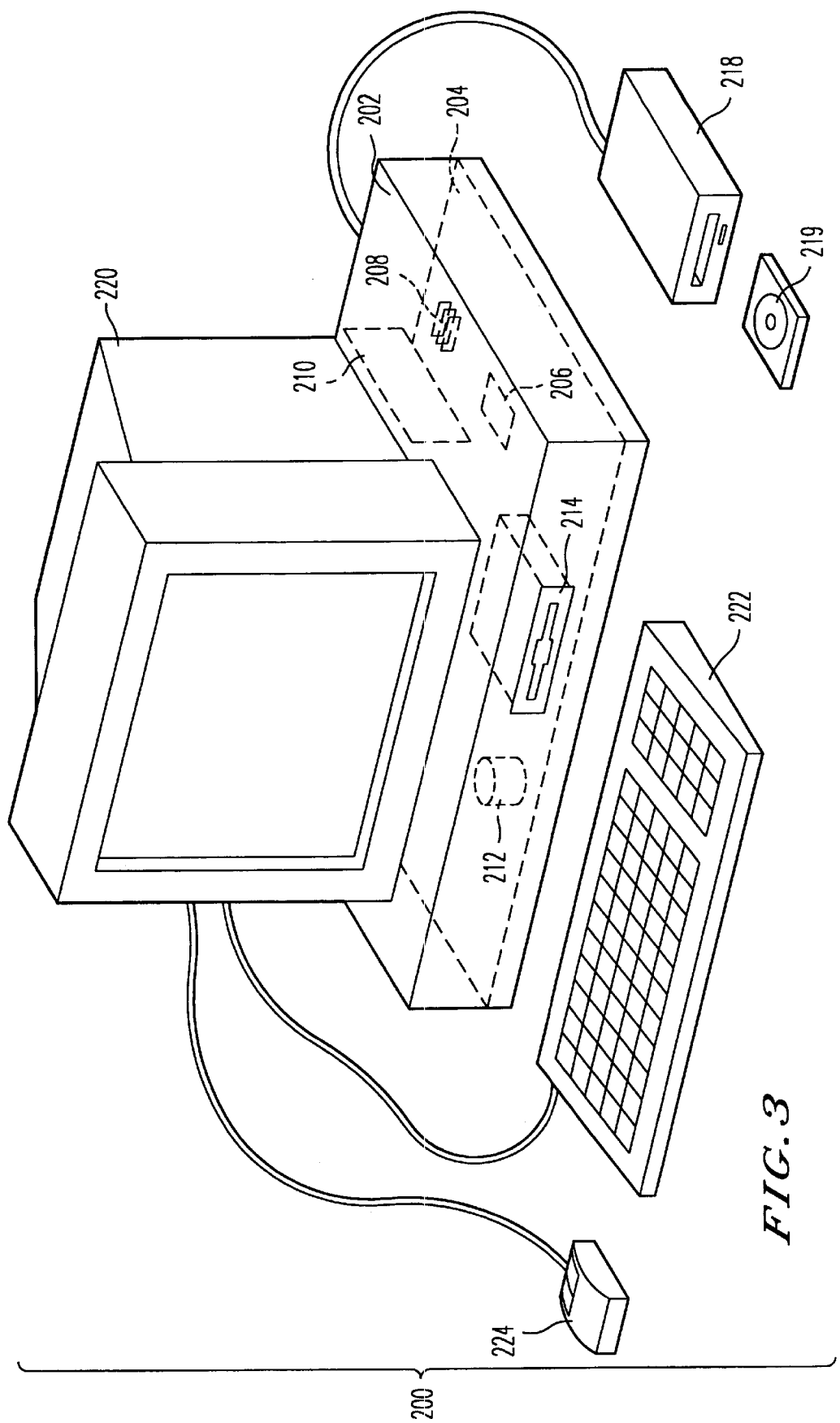
FIG. 3 is a schematic illustration of a control system of the present invention.

A computer 200 as shown in FIG. 3 includes a computer housing 202 which houses a motherboard 204, which in turn contains a CPU 206, memory 208 (e.g., DRAM, ROM, EPROM, EEPROM, SRAM and Flash RAM), and other optional special purpose logic devices (e.g., ASICs) or configurable logic devices (e.g., GAL and reprogrammable FPGA). The computer 200 can also include plural input devices (e.g., a keyboard 222 and mouse 224), and a display card 210 for controlling monitor 220. In addition, the computer system 200 includes a floppy disk drive 214; and/or other removable media devices (e.g., compact disc 219, tape, and removable magneto-optical media (not shown)); and a hard disk 212, or other fixed, high density media drives, connected using an appropriate device bus (e.g., a SCSI bus or an Enhanced IDE bus). Although compact disc 219 is shown in a CD caddy, the compact disc 219 can be inserted directly into CD-ROM drives which do not require caddies. Also connected to the same device bus or another device bus as the high density media drives, the computer 200 may additionally include, if desired, a compact disc reader 218, a compact disc reader/writer unit (not shown) or a compact disc jukebox (not shown).

The system further includes at least one computer readable medium. Examples of computer readable media are compact discs 219, hard disks 212, floppy disks, tape, magnetooptical disks, PROMs (EPROM, EEPROM, Flash EPROM), DRAM, SRAM, etc. Stored on any one or on a combination of the computer readable media, the present invention can include software for controlling both the hardware of the computer 200 and for enabling the computer 200 to interact with a human user. Such software may include, but is not limited to, device drivers, operating systems and user applications, such as development tools. Such computer readable media further includes a computer program embodying the control system as shown in the non-limiting embodiment of FIG. 2. These computer readable media can include programs, dynamic link libraries, scripts, or any other executable or interpreted code, including, but not limited to, Java code, C or C++ code, Perl scripts, and Active X controls. Preferably, computer 200 also includes at least one device bus (not shown) for receiving input form temperature sensors 17, 31, 35, 37, and the same or another device bus for sending output to electric resistance heaters 29, chiller pump 23, compressor 25, free radical supply pumps 61 and 63 and contaminated solvent pump 62.

Referring again to FIG. 2, set parameters input 72 may include input options for operating parameters such as operating temperatures 76, timers 78, safety shutoffs 80, preferences 82, and temperature alarms 84 and return.

Operating temperature input 76 preferably includes oil temperature input 86, turn water on input 88, distillation temperature input 90, and empty stillbottoms temperature input 92. In operation, the oil temperature input 86 allows a user to input a temperature at which the heating oil is to be maintained and therefore used as a reference to control the temperature of the heating oil which is monitored via oil temperature sensor 31. Turn water on temperature input 88 allows a user to input a vapor temperature at which water supply pump 23 is to be initially activated when the vapors in tank 14 reaches the input temperature where the vapor temperature is detected by temperature sensor 37. Distillation temperature input 90 preferably includes vapor temperature input 94 and still bottom temperature input 96. Stillbottoms temperature input 96 allows a user to input a temperature at which the stillbottoms are to be maintained, where the temperature of the stillbotttoms is detected by temperature sensor 39.

Preferably, the controller includes at least one proportional integration derivation (PID) controller for correcting the temperatures of the fluid and the heater 28, the fluid in chiller 30. A PID can be used to control the temperature of the heating oil by signaling the electrical resistance heaters 29 within oil bath 28 to either turn on or turn off respectively when the temperature detected by sensor 31 is below the predetermined temperature input to oil temperature input 86 or above the predetermined temperature input to oil temperature input 86. Empty stillbottoms temperature input 92 allows a user to input a temperature, above which, control system 70 prevents stillbottoms tap 64 from being opened. To prevent stillbottoms tap 64 form being opened, control system 70 may be provided with a light (not shown) indicating that a user should not open the stillbottoms tap 64, or control system may be connected to any known locking device (not shown), such as a solenoid driven locking device which can be either locked or unlocked by energizing the solenoid. In this embodiment, where the solvent to be recovered is THF and the free radical scavenger is BHT, operating temperatures are set for oil temperature input 86 preferably at 280 F., turn water on input 88 preferably at 120 F., vapor temperature input 94 preferably at 158 F., still bottom temperature input 96 preferably at 155 F. and empty stillbottoms temperature input 92 preferably set at 110 F . This last set point, 92, also corresponds to the "safe-to-open" temperature. Return 98 may be provided to return a display such as monitor 220 to a screen where a user may select any of the set parameter inputs.

Timers input 78 preferably includes autofill system input 100, additive pump timer input 102, solvent pump timer input 104, vacuum timer input 106, internal clock timer input 108, and return 110.

Autofill system timer 100 preferably includes system timer input 112, initial fill timer 114, float bounce timer 116, float fail timer 118 and a return to select timer 120. In operation, system timer input 112 allows a user to input a time over which it is desired that an autofill cycle will continue. In an autofill mode cycle (described in detail hereinafter), the control system 70 allows the recovery system 10 operate for only a predetermined amount of time and thereafter shuts down the system automatically. Throughout operation, stillbottoms continuously accumulate in the bottom portion of the distillation tank 14. Therefore, a user may prefer to input a time to system timer input 112 that corresponds to the amount of time recovery system 10 can run before an excessive amount stillbottoms collect in distillation tank 14. Alternatively, timer input 112 can be set to an amount of time which corresponds to personnel shift changes so that, e.g., a recovery cycle will end at the beginning of a shift change so that personnel beginning a new shift can clean distillation tank 14 and/or condenser 16, then restart the system.

Initial fill timer input 114 allows a user to input a time over which pump 62 is activated to initially fill distillation tank 14 with solvent from contaminated solvent tank 12. For example, a user may input a time which corresponds to the amount of time pump 62 requires to fill distillation tank 14 when tank 14 is empty. Float bounce timer input 116 allows a user to input a time delay, during which the control system will wait after the top float 24 has been triggered by a falling level of liquid solvent in tank 14, before control system 70 signals pump 62 to refill tank 14. Float bounce timer input 116 is preferably set to a time that it takes pump 62 to refill the liquid level of solvent into the solution tank 14 so that there is a maximum level of liquid solvent in distillation tank 14. Return to select timer 120 is used to return a display such as monitor 220 to a screen where a user may select any of timers 100, 102, 104, 106 or 108.

Additive pump timer 102 preferably includes distillation tank pump timer 122 and clean solvent tank timer 124. Distillation tank additive pump timer 122 allows a user to input a time interval during which pump 61 is activated to add a free radical scavenger substance to the distillation tank. Preferably, distillation tank pump timer 122 is set to periodically add free radical scavenger substance to the distillation tank 14 throughout the recovery process. However, pump 61 may alternatively be controlled according to the concentration of free radical scavenger substance in the distillation tank 14. For example, distillation tank 14 might be provided with means for measuring the concentration of free radical scavenger substance in distillation tank 14 and the control system 70 may be provided with a controller for operating pump 61 according to the concentration measured in distillation tank 14. The operation of pump 61 may alternatively be triggered to correspond to the operation of pump 62, e.g., pump 61 may be triggered to add free radical scavenger substance to the distillation tank 14 whenever pump 62 is triggered to add contaminated solvent to tank 14. Alternatively, pump 61 may be configured to provide a constant but small flow of free radical scavenger material to distillation tank 14, however, such a flow would need to be supplemented when tank 14 is initially filled. Since the flow of solvent through the recovery system 10 is relatively uniform during a recovery cycle, the depletion of the free radical scavenger material is predictable. Therefore, it is not necessary to measure the concentration in the distillation tank 14, or to synchronize the addition of free radical scavenger material to tank 14 with the addition of contaminated solvent to tank 14. Rather, a predetermined time interval can be used to signal pump 61 to turn on and off in order such that a predetermined level of concentration of free radical scavenger substance is maintained in distillation tank 14.

Clean tank additive pump timer 124 is used to operate clean solvent tank additive pump 63, similar in fashion to distillation tank additive pump timer 122. By way of example, settings for the various timers which have been found satisfactory in recovering THF, utilizing BHT as the free radical scavenger substance, include setting the system timer input 112 to approximately 8 hours, the initial fill timer 114 to approximately 24 minutes so that approximately 110 gallons is transferred to tank 14, float bounce timer 116 to approximately 3 minutes, float fail timer 118 is preferably set to 30 seconds. Furthermore, distillation tank additive pump timer 122 is set to activate pump 61 for 45 seconds every 20 minutes when the recovery system is operating, thereby adding approximately 350–550 ml after the initial fill cycle is activated by float 24. Clean tank additive pump time 124 is preferably set to activate pump 63 for 45 seconds every 20 minutes when the recovery system is operating, thereby adding approximately 350–550 ml after the initial fill cycle is activated by float 24.

Safety shut-off input 80 preferably includes an oil temperature shut-off input 122, and a distillate temperature shut-off input 124. Oil temperature shut-off temperature input 122 allows a user to input an oil temperature threshold above which control system 70 shuts the system down. Preferably, when the oil temperature shut-off value has been exceeded, resistance heaters 29 are shut off. However, it is preferable that chiller 30 and pump 23 be allowed to continue to operate so that the vapor is allowed to continue to condense in the condenser. Condenser distillate temperature shut-off temperature input 124 allows a user to input a temperature, above which control system 70 shuts off heater 28. In an example using THF as the solvent to be recovered in BHT as the free radical scavenger substance, oil temperature safety shut-off input 112 is preferably set to 300 F. and condenser distillate temperature monitored by temperature sensor 17, and safety shut-off set to 110 F.

Preferences input 82 preferably includes temperature units input 126 and time unit selector 128. Temperature unit input 126 includes a setting for Fahrenheit 130 or Celsius 132, and thereby allows a user to choose the output units which will be displayed for viewing by an operator. Time unit input 128 can include, e.g., a 12 hour clock setting 134 or a 24 hour clock setting 136, or optionally both to allow a user to choose the style of display that time units will be shown in displayed, for example a 12 hour clock, or 24 hour or military style time unit.

Temperature alarm input 84 includes oil temperature alarm input 138, vapor temperature alarm input 140, distillate temperature alarm 142, stillbottoms temperature alarm input 144 and return 146. Oil temperature alarm input 138 allows a user to input a threshold temperature for activating an alarm (not shown) when the oil temperature in heater 28 rises above the threshold temperature. Vapor temperature alarm input 140 allows a user to input a threshold vapor temperature for triggering an alarm when the vapor temperature in distillation tank 14 rises above the threshold temperature. Distillate temperature alarm input 142 allows a user to input a threshold temperature for triggering an alarm when the distilled solvent leaving condenser 16 rises above the threshold temperature. Stillbottoms temperature alarm 144 allows a user to input a threshold temperature for triggering an alarm when the temperature of the stillbottoms in distillation tank 14 rises above the threshold temperature. Temperature alarm return 146 returns a display such as monitor 220 to a screen where a user may select anyone of the parameter categories, 76, 78, 80, 82 or 84. Return 148 is provided to return a display such as monitor 220 to a screen where a user may choose between said parameters input 72 or operate machine input 74.

Operate machine input 74 includes main cycle timer input 150, select mode input 152 and stop autofill input 154.

Main cycle timer input 150 preferably includes a check settings input 156, auto start input 158, and a finish cook down input 160. Check settings input 156 is preferably used to request an operator to verify that the parameters in the set parameters input 72 are correct. Auto start input 158 preferably includes a start at time input 160, a start in time input 164 and a cancel timer input 166. The start at time input 162 allows a user to input a clock time at which a recovery cycle is desired to begin. Control system 70 will therefore automatically begin a recovery process cycle at the time input by the user to input 162. Start in time input 164, similarly to input 162, allows a user to input a length of time, such as hours and minutes, after the expiration of which, control system 70 will initiate a recovery process cycle. Cancel timer input 166 is configured to cancel any start at time or start in time input. Finish cook down input is a manual input to override the automode and allow for completion of distillation of the solvent remaining in the still. Finish cook down cycle can take approximately 8 hours.

Select mode input 152 preferably includes fill mode input 168 and vacuum mode input 170. Fill mode input 168 preferably includes a batch mode input 172 and an autofill input 174. Batch mode input 172 allows a user to select a batch mode where the control system 70 operates from a single initial fill cycle to fill the distillation tank 14 once and proceed with a recovery cycle until the distillation tank is empty. Autofill mode input 174 allows a user to select an autofill mode wherein the control system 70 automatically fills the distillation tank 14, proceeds with a recovery cyle, and thereafter maintains a perdetermined level of liquid solvent in distillation tank 14 throughout the cycle. For example, control system 70 detects a predetermined level of liquid solvent in distillation tank 14 via top level flow 24. When top float 24 is triggered by a falling level of liquid in tank 14, control system 70 operates pump 62 until the predetermined time entered at float bounce timer input 116 has elapsed, and thereby maintains a proper level of liquid solvent and distillation tank 14. Vacuum mode input 170 preferably includes an automatic mode input 176 and manual mode input 178. If recovery system 10 is provided with a vacuum pump 51, control system 70 may include vacuum mode input 170 which allows a user to choose a vacuum mode wherein the contaminated solvent in the distillation tank is vaporized by producing a vacuum with vacuum pump 51 above the level of liquid solvent in the distillation tank 14. When run in vacuum mode, controller 70 may be used to control valve 55 to limit the amount of liquid allowed to enter tank 14 under the vacuum created by compressor 51, similar to the manner in which control system 70 controls pump 62 in the fill mode.

Stop autofill input 154 preferably includes a stop autofill input 180 and return 182. Stop autofill input 180 allows a user to stop the auto-filling of the distillation tank 14 after an autofill mode has been selected by triggering autofill mode input 174. Return 182 returns a display, such as monitor 220, to a screen where a user may choose the any of the operate machine input 74 or the set parameters input 72.

Figure 4:
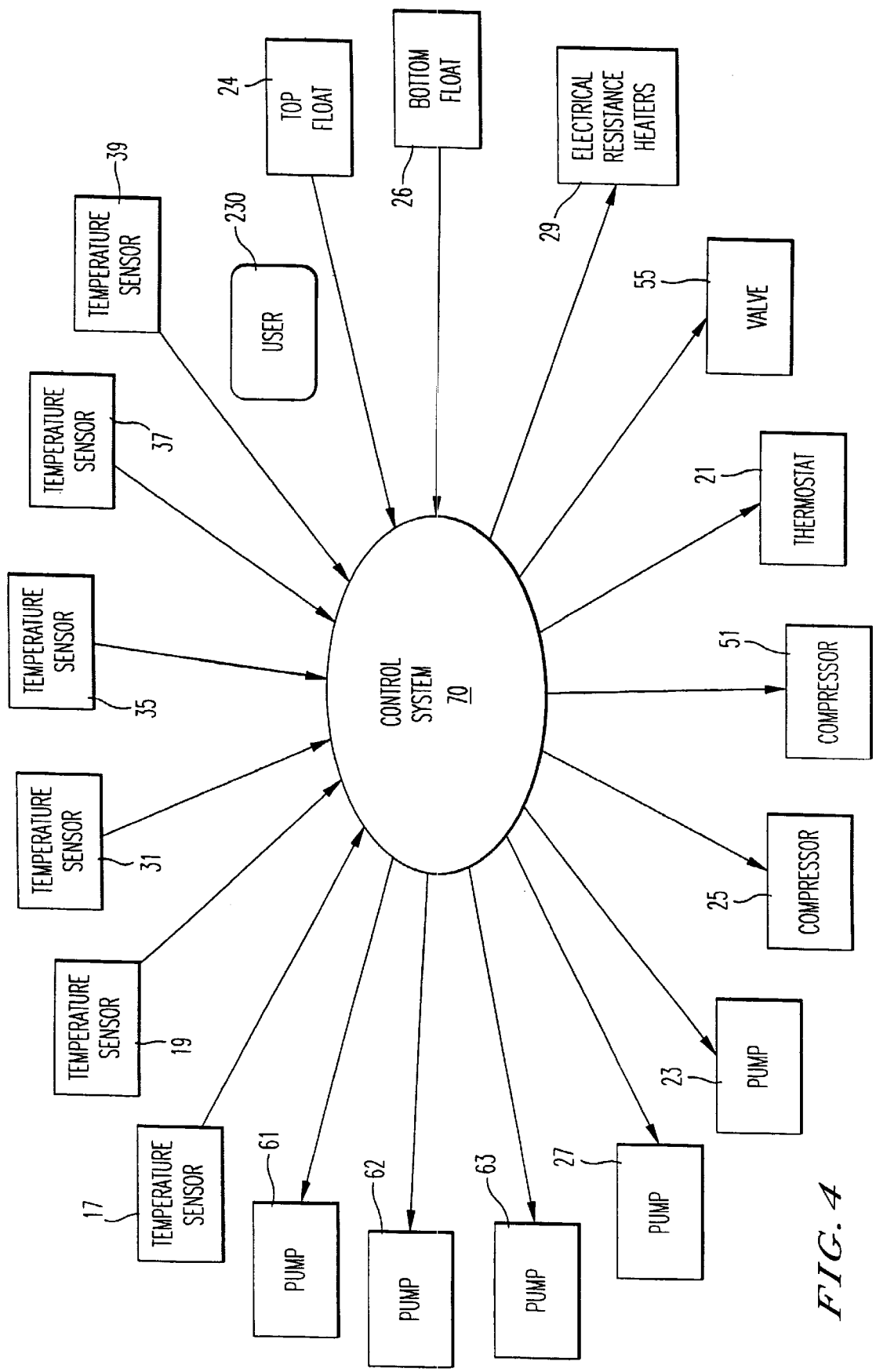
FIG. 4 is a schematic representation of the layout of a control system according to the present invention.

A layout of the inputs and outputs of control system 70 configured for a recovery system that can provide vaporization through both heat or vacuum is illustrated in FIG. 4. As shown in the figure, control system 70 preferably accepts input from temperature sensors 17, 19, 31, 35, 37 and 39, from top float 24, bottom float 26, and from a user 230. According to the above described operation, control system 70 controls the operation of recovery system 10 by processing information gathered from the accepted input and provides output to pumps 23, 27, 61, 61, 63, compressor 25, electrical resistance heaters 29, vacuum pump 51 and valve 55. However, as discussed above, a recovery system that performs vaporization only through vacuum, does not require several components provided in the system which performs vaporization through both vacuum and/or heating. For example, a recovery system that performs vaporization only through vacuum may not use a heater 28, electrical resistance heaters 29 or pump 27. Since a substantial vacuum is needed to perform vaporization through vacuum, the system could operate without pump 62. Furthermore, since the distillation tank 14 is not heated, chiller 30, compressor 25, thermostat 21 and temperature sensor 17 would be unnecessary. However, a cooling system such as chiller 30 and its associated somponents could be used for emergency situations where solvent in distillation tank 14 is inadvertently heated.

The operation of the control system 70 in autofill mode will now be described as an example of the interaction between recovery system 10 and control system 70. As described above, a recovery cycle may be initiated by choosing to start the process immediately, or by entering a predetermined time at which the process is to begin by entering a particular time of day to start at time input 162. Alternatively, an operator may input a length of time, after which the process is to begin, by entering a length of time to start in time input 164. After the time of day has been reached, the length of time has elapsed, or if the system is immediately started, the control system 70 issues signals to several components in order to start a recovery process.

Furthermore, when initializing recovery system 10, control system 70 adds free radical scavenger material to tanks 14 and 18 by controlling pumps 61 and 63 respectively, according to the time intervals input to distillation tank pump timer input 122 and clean tank pump timer input 124. In initializing the recovery system 10, control system 70 turns on pump 62 for the time period input to initial fill timer input 114, turns on elements 29 or 29a which thereby begins to heat the heat transfer medium contained in oil bath 28 or heater 28a, turns on pump 23 and chiller 30. Since it typically takes some time before the temperature of the solvent in distillation tank 14 rises to a temperature necessary for vaporization, control system 70 may optionally delay the initialization of pump 23 until the solvent reaches the temperature input to turn water on temperature input 88. As described above, control system 70 may use a PID to control the temperature of the heat transfer medium in heater 28 according to temperature input 86.

As the liquid solvent in tank 14 is heated and vaporized, the level of liquid solvent in tank 14 drops. Eventually, the level of liquid solvent in tank 14 will drop to such a level that top float 24 is triggered. When control system 70 is run in "autofill" mode, it will automatically refill tank 14 when float 24 is triggered by initiating an autofill cycle where pump 62 is energized, after which pumps 61 and 63 are energized for 45 seconds for additive injection. When run in "batch" mode, control system 70 initiates an initial fill cycle, but will not initiate an autofill cycle. Rather, system 70 will allow the level of liquid solvent to continue to fall until it reaches bottom float 26, wherein control system 70 will shut down once still bottoms goals are met (by either level or temperature sensors).

As further safety precautions, an auto fill cycle is assumed complete when float valve 24 does not rise within the time limit for float failure (45 seconds). Cookdown does not begin until the vapor temperature set point, still bottoms set point, or float valve 26 is reached. Alternatively, control system 70 will enter the cookdown cycle at which time autofill cycles are stopped and the remaining solvent in tank 14 is allowed to cookdown until the vapor temperature set point, still bottoms set point, or float valve 26 is reached. When the condensed liquid solvent leaving condenser 16 exceeds the temperature input to distillate temperature input 124, the system will shut down. Furthermore, control system 70 may provide a visual signal and/or lock stillbottoms tap 64 until the temperature of the stillbottoms collected in tank 14 has fallen to the temperature input 92, thereby preventing the removal of stillbottoms before they have cooled to a safe temperature.

In order to warn users of impending problems, control system 70 also includes alarms that are triggered by excessive temperatures. For example, control system 70 will produce an audio and/or visual alarm when the temperature of the heat transfer medium in oil bath 28 or heater 28a exceeds the temperature input 138, when the temperature of the vapor in tank 14 exceeds the temperature input to vapor temperature input 140, when the temperature of the liquid solvent leaving condenser 16 exceeds the temperature input to distillate temperature input 142, or when the temperature of the stillbottoms collected in tank 14 exceeds the temperature input to stillbottoms temperature input 144.

Obviously, numerous modifications and variations of the present invention are possible in light of the above teachings. It is therefore to be understood that, within the scope of the appended claims, the invention may be practiced otherwise than as specifically described herein.

What is claimed is:

1. A solvent recovery system comprising:
   vaporization means for vaporizing a contaminated liquid solvent and thereby producing a solvent vapor;
   free radical scavenger storage means for storing a free radical scavenger substance;
   free radical scavenger vaporizer injection means for providing a free radical scavenger substance from said free radical scavenger storage means to the liquid solvent in said vaporization means;
   means for heating the liquid solvent in said vaporization means and means for turning off said means for heating upon the occurrence of at least one of: (a) a vapor temperature in said vaporization means exceeding a predetermined temperature, (b) a temperature of stillbottoms in said vaporization means exceeding a predetermined temperature, and (c) a level of liquid solvent in said tank being below a predetermined level;
   a chiller means for cooling stillbottoms which collect in a bottom portion of said vaporization means.

2. A solvent recovery system according to claim 1, wherein said means for heating employs heating oil as a working fluid and includes electric resistance heaters for heating the heating oil.

3. A solvent recovery system according to claim 1, wherein said vaporization means includes vacuum means for generating a reduced pressure environment in order to vaporize the contaminated solvent.

4. A solvent recovery system according to claim 1, wherein said solvent is an organic solvent.

5. A solvent recovery system according to claim 1, wherein said solvent is tetrahydrofuran, and wherein said free radical scavenger substance is butylated hydroxy toluene.

6. A solvent recovery system as recited in claim 1, wherein said means for turning off said means for heating does not turn off said chiller means such that said chiller means continues operating when said means for heating is turned off by said means for turning off said means for heating.

7. A solvent recovery system comprising:

vaporization means for vaporizing a liquid solvent and thereby producing a solvent vapor; free radical scavenger storage means for storing a free radical scavenger substance;

free radical scavenger vaporizer injection means for providing a free radical scavenger substance from said free radical scavenger storage means to the liquid solvent in said vaporization means;

a chiller means for cooling stillbottoms which collect in a bottom portion of said vaporization means;

condensing means for condensing the solvent vapor leaving said vaporization means;

clean solvent receiving means for receiving the condensed solvent leaving said condensing means and for holding said condensed solvent as a clean solvent; and means for feeding said clean solvent to said free radical scavenger storage means such that said free radical scavenger storage means stores a mixture of said clean solvent and said free radical scavenger substance;

wherein said free radical scavenger vaporizer injection means provides said mixture of said clean solvent and said free radical scavenger substance to the liquid solvent in said vaporization means to thereby provide said free radical scavenger substance to said liquid solvent in said vaporization means.

8. A solvent recovery system comprising:

vaporization means for vaporizing a liquid solvent and thereby producing a solvent vapor;

free radical scavenger storage means for storing a free radical scavenger substance;

free radical scavenger vaporizer injection means for providing a free radical scavenger substance from said free radical scavenger storage means to the liquid solvent in said vaporization means;

a chiller means for cooling stillbottoms which collect in a bottom portion of said vaporization means;

condensing means for condensing the solvent vapor leaving said vaporization means;

clean solvent receiving means for receiving the condensed solvent leaving said condensing means;

oxygen displacer storage means for storing an oxygen displacing substance; and oxygen displacer injection means for providing an oxygen displacing substance from said oxygen displacer storage means to said free radical scavenger storage means and to said clean solvent receiving means.

9. A solvent recovery system according to claim 8, wherein said oxygen displacing substance is nitrogen gas.

10. A solvent recovery system comprising:

vaporization means for vaporizing a liquid solvent and thereby producing a solvent vapor;

free radical scavenger storage means for storing a free radical scavenger substance;

free radical scavenger vaporizer injection means for providing a free radical scavenger substance from said free radical scavenger storage means to the liquid solvent in said vaporization means;

a chiller means for cooling stillbottoms which collect in a bottom portion of said vaporization means;

contaminated solvent storage means for storing contaminated solvent;

oxygen displacer storage means for storing an oxygen displacing substance; and oxygen displacer injection means for providing an oxygen displacing substance from said oxygen displacer storage means to said free radical scavenger storage means and to said contaminated solvent storage means.

11. A method for recovering a contaminated solvent comprising the steps of:

vaporizing a contaminated solvent, thereby forming a solvent vapor;

adding a free radical scavenger substance to the contaminated solvent during said step of vaporizing the contaminated solvent, wherein the contaminated solvent is tetrahydrofuran, and wherein the free radical scavenger substance is butylated hydroxy toluene.

12. A method for recovering a contaminated solvent according to claim 11, further comprising the steps of:

condensing the solvent vapor;

collecting the condensed solvent vapor in a clean solvent tank; and further adding the free radical scavenging substance to the clean solvent tank.

13. A method for recovering a contaminated solvent according to claim 12, further comprising the steps of:

storing the free radical scavenging substance in a free radical tank;

storing the contaminated solvent in a contaminated solvent tank; and circulating an oxygen displacing substance through the free radical tank, the contaminated solvent tank and the clean solvent tank.

14. A method for recovering a contaminated solvent according to claim 12, further comprising the step of:

maintaining a concentration of butylated hydroxy toluene in the clean solvent tank to at least 400 parts per million.

15. A method for recovering a contaminated solvent according to claim 11, further comprising the step of:

circulating an oxygen displacing substance through a clean solvent tank.

16. A method for recovering a contaminated solvent according to claim 15, wherein the oxygen displacing substance is nitrogen gas.

17. A method for recovering a contaminated solvent according to claim 11, further comprising the step of:

maintaining a concentration of butylated hydroxy toluene in the contaminated solvent during the step of vaporizing to approximately 400 parts per million.

18. A method for recovering a contaminated solvent according to claim 11, wherein said vaporizing step comprises providing heat to the solvent from a heater using heating oil as a working fluid in order to vaporize the contaminated solvent.

19. A method for recovering a contaminated solvent according to claim 18 wherein the heating oil is heated by electrical resistance heaters.

20. A method for recovering a contaminated solvent according to claim 11, wherein said vaporizing step comprises providing a reduced pressure environment to the contaminated solvent in order to vaporize the contaminated solvent.

21. A method for recovering a contaminated solvent according to claim 11, further comprising the step of:

cooling stillbottoms which collect during the vaporizing step with a chiller, wherein the chiller circulates cooled fluid in a bottom portion of a vaporization chamber, wherein said vaporizing step is performed in the vaporization chamber.

22. A method for recovering a contaminated solvent comprising the steps of:

vaporizing a contaminated solvent, thereby forming a solvent vapor; and adding a free radical scavenger substance to the contaminated solvent during said step of vaporizing the contaminated solvent, wherein the free radical scavenger substance includes butylated hydroxy toluene, and wherein the method further includes maintaining a concentration of the butylated hydroxy toluene in the contaminated solvent during the step of vaporizing to approximately 400 parts per million.

23. A method for recovering a contaminated solvent comprising the steps of:

vaporizing a contaminated solvent, thereby forming a solvent vapor;

adding a free radical scavenger substance to the contaminated solvent during said step of vaporizing the contaminated solvent, wherein the free radical scavenger substance includes butylated hydroxy toluene, and wherein the method further includes maintaining a concentration of the butylated hydroxy toluene in the clean solvent tank to at least 400 parts per million;

condensing the solvent vapor;

collecting the solvent vapor in a clean solvent tank; and adding a free radical scavenging substance to the clean solvent tank.

24. A solvent recovery system comprising:

vaporization means for vaporizing a liquid solvent and thereby producing a solvent vapor;

free radical scavenger storage means for storing a free radical scavenger substance; and free radical scavenger vaporizer injection means for providing a free radical scavenger substance from said free radical scavenger storage means to the liquid solvent in said vaporization means;

condensing means for condensing the solvent vapor leaving said vaporization means to provide a clean solvent;

clean solvent receiving means for receiving the clean solvent leaving said condensing means;

means for feeding clean solvent from said clean solvent receiving means to said free radical scavenger storage means such that said free radical scavenger storage means stores a mixture of said clean solvent and said free radical scavenger substance; and wherein said free radical scavenger vaporizer injection means further provides said mixture of said clean solvent and said free radical scavenger substance to the liquid solvent in said vaporization means to thereby provide said free radical scavenger substance to the liquid solvent in said vaporization means.

25. A solvent recovery system as recited in claim 24, further including:

a chiller means for cooling sediment which collect in a bottom portion of said vaporization means; and means for heating the liquid solvent in said vaporization means and means for turning off said means for heating upon the occurrence of at least one of: (a) a vapor temperature in said vaporization means exceeding a predetermined temperature, (b) a temperature of stillbottoms in said vaporization means exceeding a predetermined temperature, and (c) a level of liquid solvent in said tank being below a predetermined level, and wherein said means for turning off said means for heating does not turn off said chiller means such that said chiller means continues operating when said means for heating is turned off by said means for turning off said means for heating.

* * * * *